United States Patent
Muller et al.

(10) Patent No.: US 9,319,341 B2
(45) Date of Patent: Apr. 19, 2016

(54) LIMITATION OF SERIAL LINK INTERFERENCE

(71) Applicant: STMICROELECTRONICS INTERNATIONAL N.V., Amsterdam (NL)

(72) Inventors: Pierre Muller, Susville (FR); Samuel Dubouloz, Vetraz-Monthoux (FR)

(73) Assignee: STMICROELECTRONICS INTERNATIONAL N.V., Amsterdam (NL)

( * ) Notice: Subject to any disclaimer, the term of this patent is extended or adjusted under 35 U.S.C. 154(b) by 192 days.

(21) Appl. No.: 14/059,412

(22) Filed: Oct. 21, 2013

(65) Prior Publication Data

US 2015/0110123 A1 Apr. 23, 2015

(51) Int. Cl.
*H04L 12/863* (2013.01)
*H04L 12/841* (2013.01)
*H04L 12/879* (2013.01)

(52) U.S. Cl.
CPC ............ *H04L 47/6245* (2013.01); *H04L 47/28* (2013.01); *H04L 49/901* (2013.01)

(58) Field of Classification Search
CPC .... H04B 1/0021; H04B 1/0046; H04B 3/464; H04L 2007/045; H04L 47/10; H04L 47/323
See application file for complete search history.

(56) References Cited

U.S. PATENT DOCUMENTS

| | | | | |
|---|---|---|---|---|
| 3,823,377 | A * | 7/1974 | Keane et al. | 375/239 |
| 6,169,889 | B1 | 1/2001 | Servilio et al. | |
| 2004/0125815 | A1* | 7/2004 | Shimazu et al. | 370/411 |
| 2007/0103204 | A1* | 5/2007 | Egan et al. | 327/100 |
| 2007/0290894 | A1* | 12/2007 | Ng et al. | 341/50 |
| 2011/0026655 | A1* | 2/2011 | Crawley et al. | 375/359 |

FOREIGN PATENT DOCUMENTS

| | | |
|---|---|---|
| CN | 10662636 A | 3/2010 |
| WO | 2013045535 A1 | 4/2013 |

* cited by examiner

*Primary Examiner* — Pao Sinkantarakorn
*Assistant Examiner* — Stephen Steiner
(74) *Attorney, Agent, or Firm* — Allen, Dyer, Doppelt, Milbrath & Gilchrist, P.A.

(57) ABSTRACT

A plurality of frames of data are transmitted over a serial interface in a manner that limits interference on the interface. This involves generating a pseudo-random number and asserting a read control signal at a moment in time, wherein a timing of the moment in time is influenced by the pseudo-random number. In response to the asserted read control signal, a frame of data is read from a data buffer. The read frame of data is then transmitted over the serial interface. A number of alternative embodiments are possible, such as embodiments in which buffer read operations are triggered based on the buffer fill level, and other embodiments in which buffer read operations are triggered by a timer. By using the pseudo-random number to influence the buffer read operations, timing coherency between the reading of frames is made low, thereby limiting interference.

5 Claims, 11 Drawing Sheets

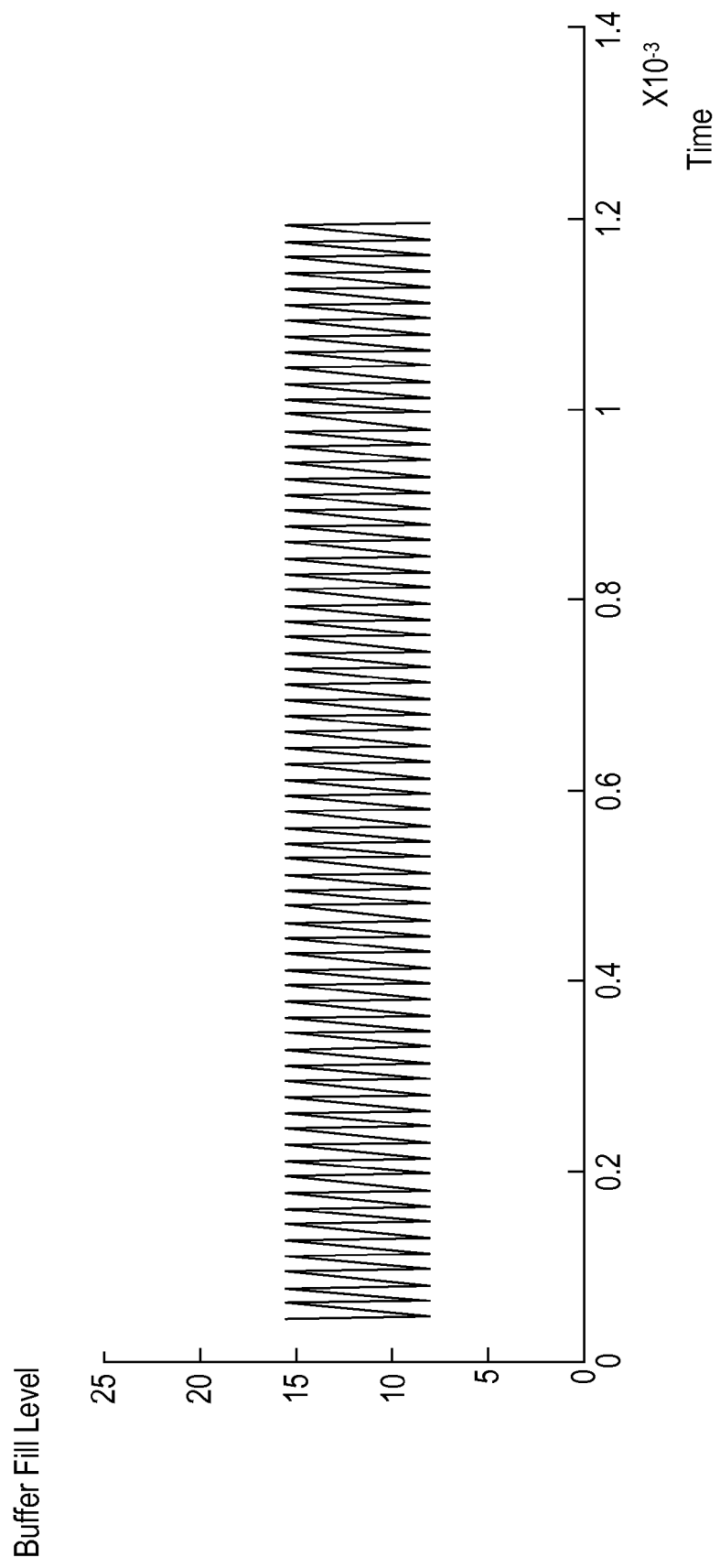

LIMITATION OF SERIAL LINK INTERFERENCE

BACKGROUND

The invention relates to technology for limiting interference associated with the communication of data by one circuit to one or more others over a serial link.

In order to reduce the pin count of an Integrated Circuit (IC), high performance serial interfaces are often used to communicate control signals and/or data between IC's. As but one of a number of possible examples, the so-called "DigRF" interface is a known, standardized serial interface. A characteristic of serial communication is the sequential transmission of one bit at a time. This can be contrasted with parallel communication, in which two or more bits are communicated simultaneously.

For a serial interface, data are formatted in a frame before being supplied for serial transmission over the interface. This is typically accomplished by buffering the data between the source of the data (e.g., a data processing block) and the serial interface block (circuit) that will actually supply the bits to the serial interface. Buffering is similarly present on the receiver side. This aspect is illustrated in FIG. 1, which is an exemplary block diagram of a circuit arrangement 100 that enables a first IC ("IC I1") 101 to communicate frames of data over a serial interface to a second IC ("IC2") 103.

In this example, a data processing block 105 supplies data 107 to a First-In-First-Out (FIFO) buffer 109. The data 107 is written into the FIFO buffer 109 under the control of a write clock (WCLK) signal 111.

Data 113 is read out of the FIFO buffer 109 and supplied to a serial interface transmit block 115, which controls this read operation by means of a read clock (RCLK) signal 117. A link 119 connects the output of the serial interface transmit block 115 to the input of a serial interface receive block 121 that is part of the second IC 103.

Components within the second IC 103 are present and arranged essentially in mirror image to those of the first IC 101. Accordingly, the serial interface receive block 121 writes the received data 123 to a FIFO buffer 125 under the control of a WCLK signal 127.

The received data stored in the second IC's FIFO buffer 125 is supplied by means of a connection 129 to a data processing block 131, which controls the reading of the FIFO buffer 125 by means of a RCLK signal 133.

Different mechanisms can be used to trigger the sending of a frame over the interface. The most common are:

Using a threshold fill level (watermark) of a buffer (e.g., the FIFO buffer 109 of FIG. 1). When the amount of data stored in the buffer reaches the threshold, a frame of data is read from the buffer and sent over the interface from the transmitter to the receiver.

Using a timer that generates a "tick" on a regular basis. The occurrence of each tick triggers the reading of data from the buffer and the sending of the frame over the interface from the transmitter to the receiver.

The communication of control signals over a serial link is usually not a significant source of interference because the amount of transmitted data is typically low, with low timing coherency. The same is not true with respect to the communication of data because data processing blocks usually transfer data at a regular rate. The rate of transmission is directly linked to processing speed divided by frame size in accordance with:

$$F_{FR} = F_{DP}/N$$

where:

$F_{FR}$ is the frequency of transmission of a frame over the serial interface;

$F_{DP}$ is the frequency at which the data processing block supplies data at its output; and N is the number of data words per frame.

A problem therefore arises in conventional technology because the regularity of serial link activity can generate Electro-Magnetic Interference (EMI) that can disturb the operation of sensitive circuitry. The source of the interference can be external to the device (i.e., the link itself) and/or internal to the device. There are several mechanisms that could lead to interference. A typical case is caused by a pattern of current consumption peaking during transmission of a frame followed by a period of no current consumption until a next frame is transmitted. This behavior creates a type of square wave signal that is applied to the power supply and leads to spurious signals being spaced apart at a rate of F.

In view of the above problems, it is desired to provide technology (e.g., methods, apparatuses, etc.) that are capable of limiting the interference that can be caused by the transmission of frames via a serial link.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof. Also, as used herein the term "exemplary" means serving as one illustration out of any number of possible illustrations.

In accordance with one aspect of the present invention, the foregoing and other objects are achieved in methods and apparatuses for transmitting a plurality of frames of data over a serial interface. This involves, for each one of the frames of data, generating a pseudo-random number, and asserting a read control signal at a moment in time, wherein a timing of the moment in time is influenced by the pseudo-random number. In response to the asserted read control signal, a frame of data is read from a data buffer, and the read frame of data is transmitted over the serial interface.

In an aspect of some but not necessarily all embodiments, asserting the read control signal at the moment in time comprises adjusting a threshold value as a function of the pseudo-random number. A data buffer fill level is compared with the adjusted threshold value and an enabling signal is asserted in response to satisfaction of a predetermined comparison criterion. Assertion of the read control signal is enabled in response to assertion of the enabling signal.

In an aspect of some but not necessarily all embodiments, asserting the read control signal at the moment in time comprises enabling assertion of the read control signal in response to detection that a timeout interval has elapsed, wherein a magnitude of the timeout interval is influenced by the pseudo-random number.

In an aspect of some but not necessarily all of these embodiments, detecting that the timeout interval has elapsed comprises producing an adjusted initial timer value by adding the pseudo-random number to an initial timer value. A counter is initialized to the adjusted initial timer value, the counter is started, and it is detected when a counter value of the counter reaches a predetermined value.

In an aspect of some but not necessarily all alternative embodiments, detecting that the timeout interval has elapsed comprises adding the pseudo-random number to a predetermined target timer value to produce an adjusted target timer value. A counter is initialized to an initial timer value and started. It is then detected when a counter value of the counter reaches the adjusted target timer value.

In an aspect of some but not necessarily all embodiments, generating the pseudo-random number comprises receiving an output value of a pseudo-random number generator. For example, and without limitation, the pseudo-random number generator can be a Linear Feedback Shift Register comprising a number, N, shift registers, and wherein the output value of the pseudo-random number generator is derived from outputs of M of the shift registers, wherein 1≤M≤N.

BRIEF DESCRIPTION OF THE DRAWINGS

The objects and advantages of the invention will be understood by reading the following detailed description in conjunction with the drawings in which:

FIGS. 9a and 9b are graphs that enable comparison between the buffer fill level without (FIG. 9a) and with (FIG. 9b) spreading in accordance with embodiments consistent with the invention.

DETAILED DESCRIPTION

Figure 1:
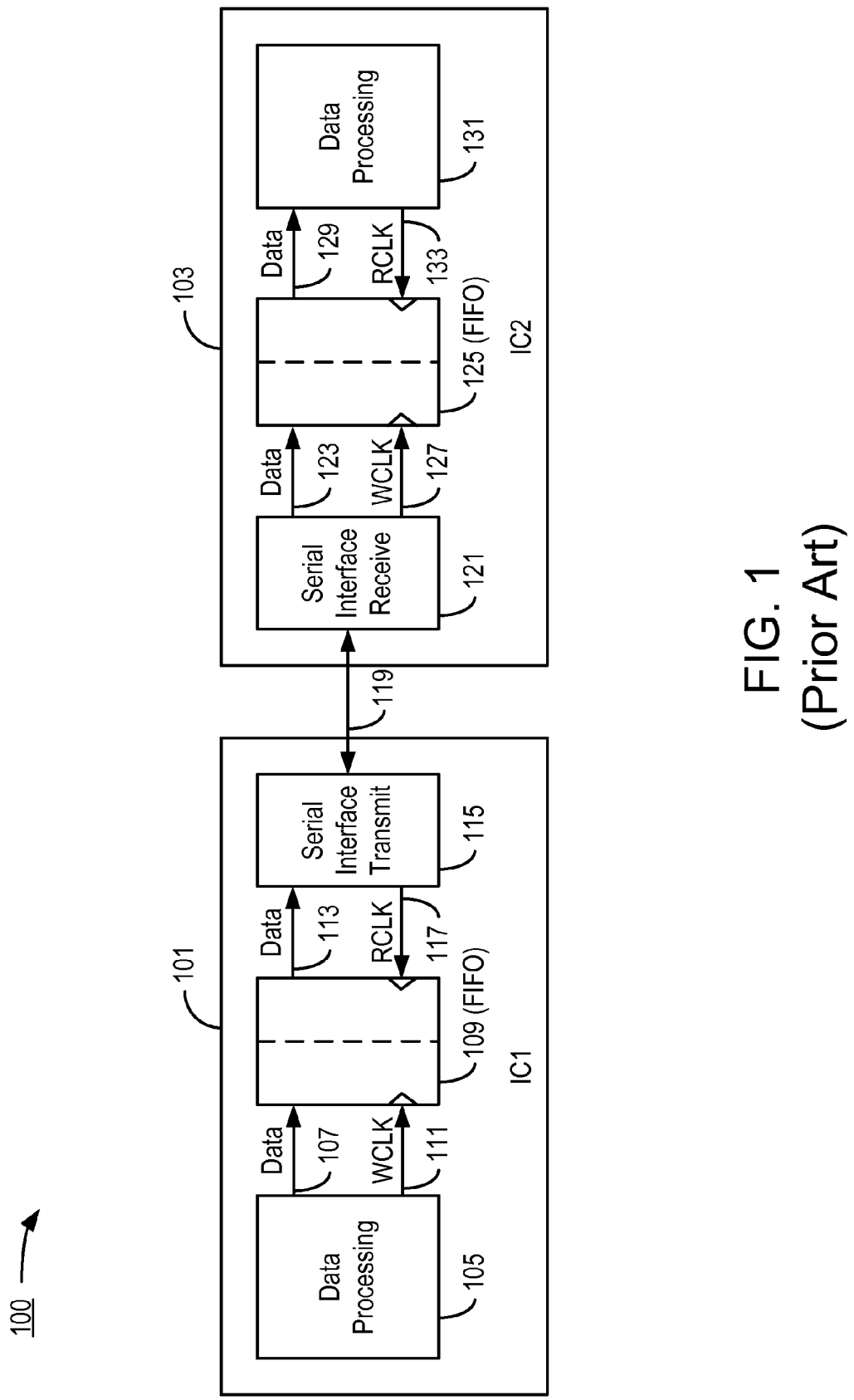
FIG. 1 is an exemplary block diagram of a circuit arrangement that enables a first IC to communicate frames of data over a serial interface to a second IC.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

As mentioned earlier, it is desired to provide technology (e.g., methods, apparatuses, etc.) that are capable of limiting the interference that can be caused by the transmission of frames via a serial link. The approach taken in various embodiments is to break the timing coherency of the activity over the serial interface by spreading the trigger for frame reading inside the buffer memory. In an aspect of embodiments consistent with the invention, this involves use of a pseudo-random number generator such as, but not limited to, a Linear Feedback Shift Register (LFSR).

Figure 2:
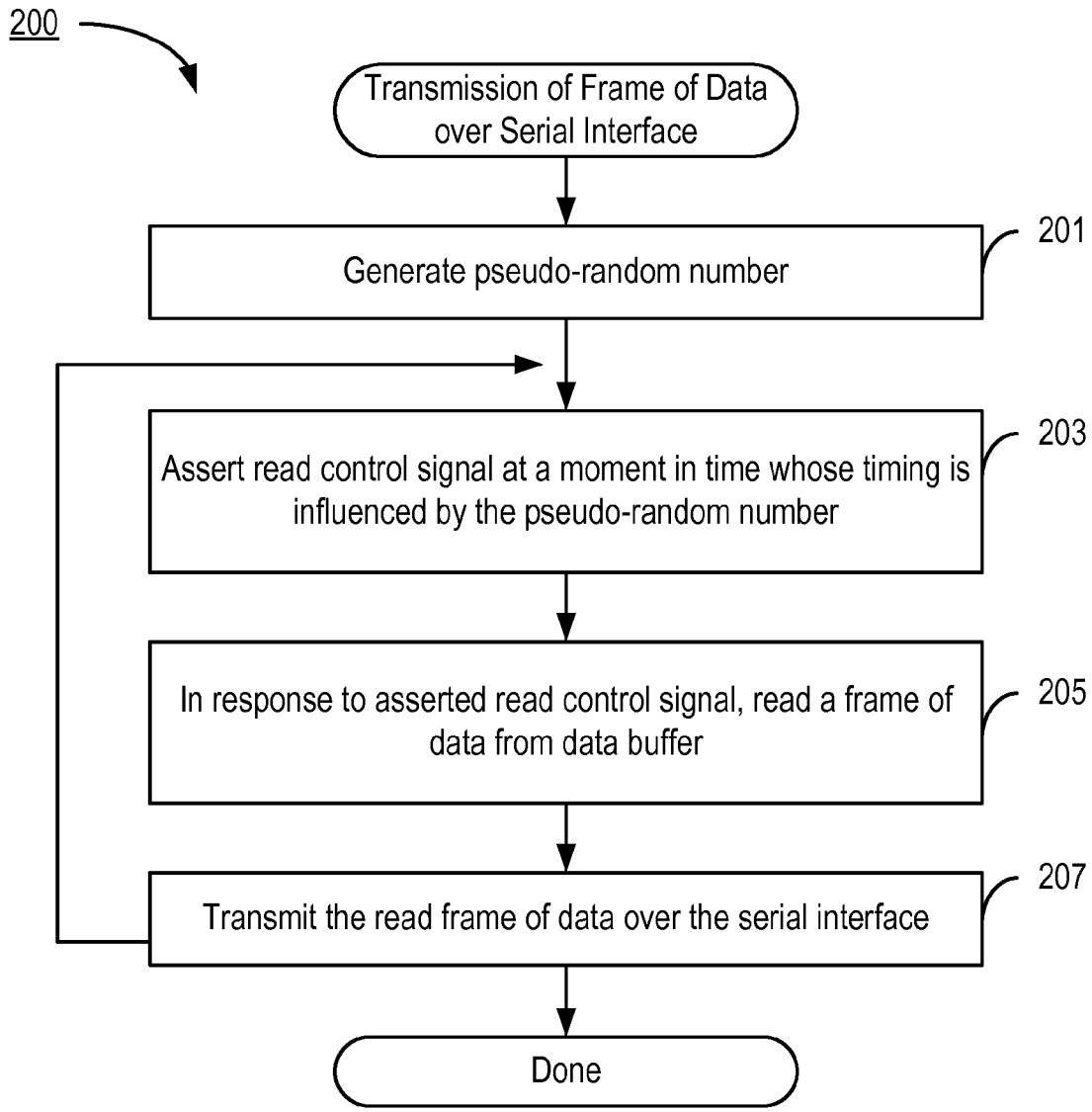
FIG. 2 is, in one respect, a flow chart of steps/processes performed by circuitry in accordance with some but not necessarily all exemplary embodiments of the invention for the purpose of transmitting a plurality of frames of data over a serial interface.

These and other aspects are illustrated in FIG. 2, which is, in one respect, a flow chart of steps/processes performed by circuitry in accordance with some but not necessarily all exemplary embodiments of the invention for the purpose of transmitting a plurality of frames of data over a serial interface. In another respect, FIG. 2 can be considered to depict exemplary means 200 comprising the various illustrated circuitry (e.g., hard-wired and/or suitably programmed processor) configured to perform the described functions.

In accordance with the illustrated embodiment, the circuitry generates a pseudo-random number (step 201). A read control signal (e.g., for reading a buffer such as the FIFO buffer 109 depicted in FIG. 1) is then asserted at a moment in time, wherein a timing of the moment in time is influenced by the pseudo-random value (step 203). Various technologies for influencing the timing of the moment in time are described in greater detail below.

In response to the asserted read control signal, the circuitry reads a frame of data from the data buffer (step 205). The frame of data supplied by the buffer in response to the read operation is then transmitted over the serial interface.

The process is then repeated for a next frame of data.

It will be appreciated that, by using a pseudo-random number to influence the timing of each frame read operation, those read operations do not occur with the same regularity that characterizes conventional techniques, and interference is thereby limited (i.e., reduced relative to the interference associated with the conventional techniques).

Figure 3:
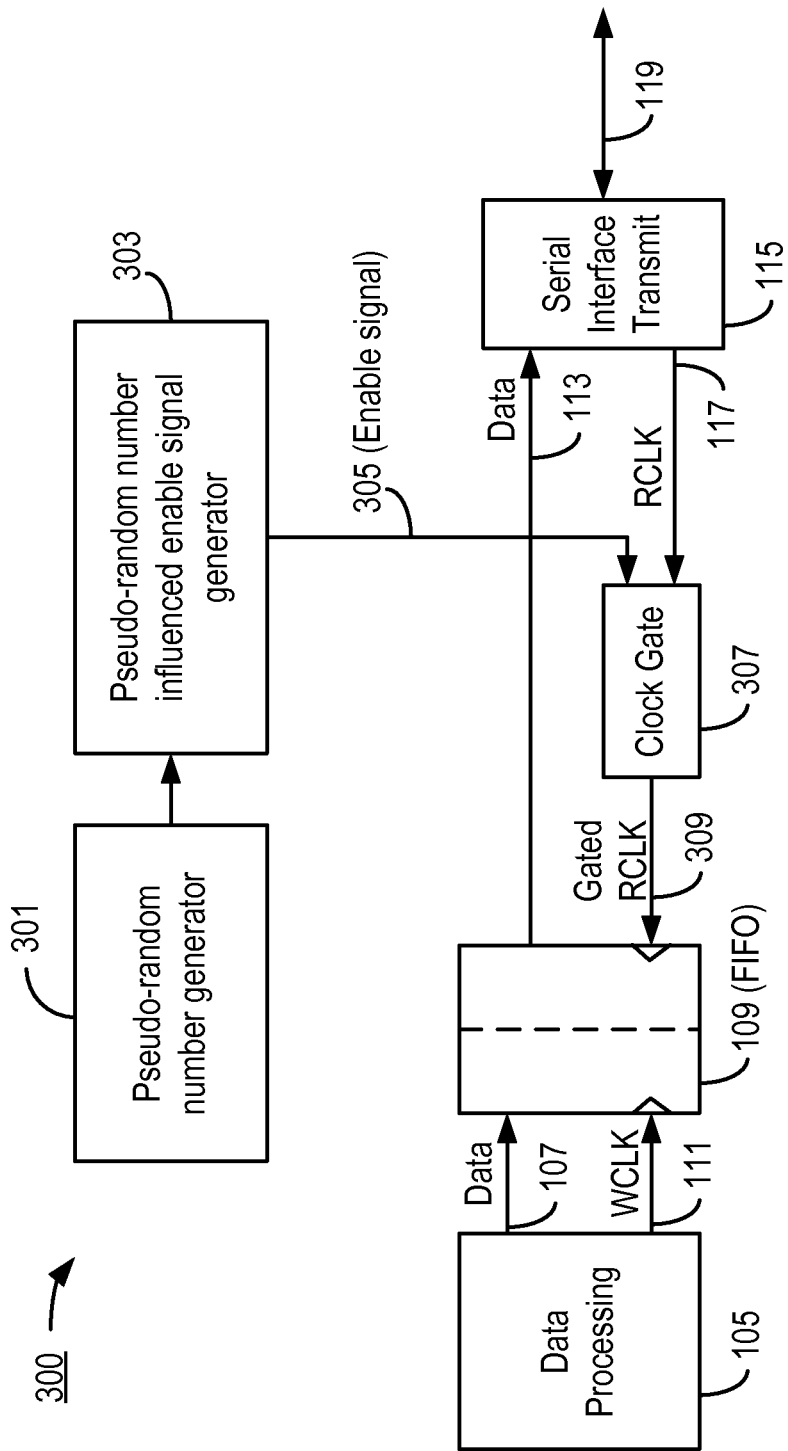
FIG. 3 is a block diagram of circuitry configured to carry out aspects of the invention, such as those illustrated in FIG. 2.

FIG. 3 is a block diagram of circuitry 300 configured to carry out aspects of the invention, such as those illustrated in FIG. 2. Some of the elements that make up the circuitry 300 are also included in the earlier-described circuitry 100, and they have therefore been identified with the same reference numerals.

In this exemplary embodiment, a data processing block 105 supplies data 107 to a FIFO buffer 109. The data 107 is written into the FIFO buffer 109 under the control of a write clock (WCLK) signal 111.

Data 113 is read out of the FIFO buffer 109 and supplied to a serial interface transmit block 115, which, in part, controls this read operation by means of a read control signal, herein depicted as the read clock (RCLK) signal 117. A link 119 connects the output of the serial interface transmit block 115 to the input of a serial interface receive block (not shown) associated with the recipient of the data.

The circuitry 300 also includes a pseudo-random number generator 301 that generates a pseudo-random number that is used to influence the start time of the next transmission of a frame of data. The pseudo-random number supplied at the output of the pseudo-random number generator is supplied to an input of a pseudo-random number influenced enable signal generator 303. The pseudo-random number influenced enable signal generator 303 generates an enable signal 305 that is supplied to one input of a clock gate 307. Another input of the clock gate 307 receives the RCLK signal 117. With this arrangement, the RCLK signal 117 is inhibited from being passed along to the FIFO buffer 109 until the enable signal 305 is asserted. The gated RCLK signal 309, made available at the output of the clock gate 307, is therefore supplied to the clock input of the FIFO buffer 109 as the read control signal influenced by the pseudo-random number.

Because of the influence of the pseudo-random number, assertions of the enable signal are not spaced apart at regular intervals, but are instead spaced apart by pseudo-randomly varying intervals. In this way, the frame transmissions are also spaced apart from one another at pseudo-randomly varying intervals, thereby limiting the generation of interference associated with the serial link.

Figure 4:
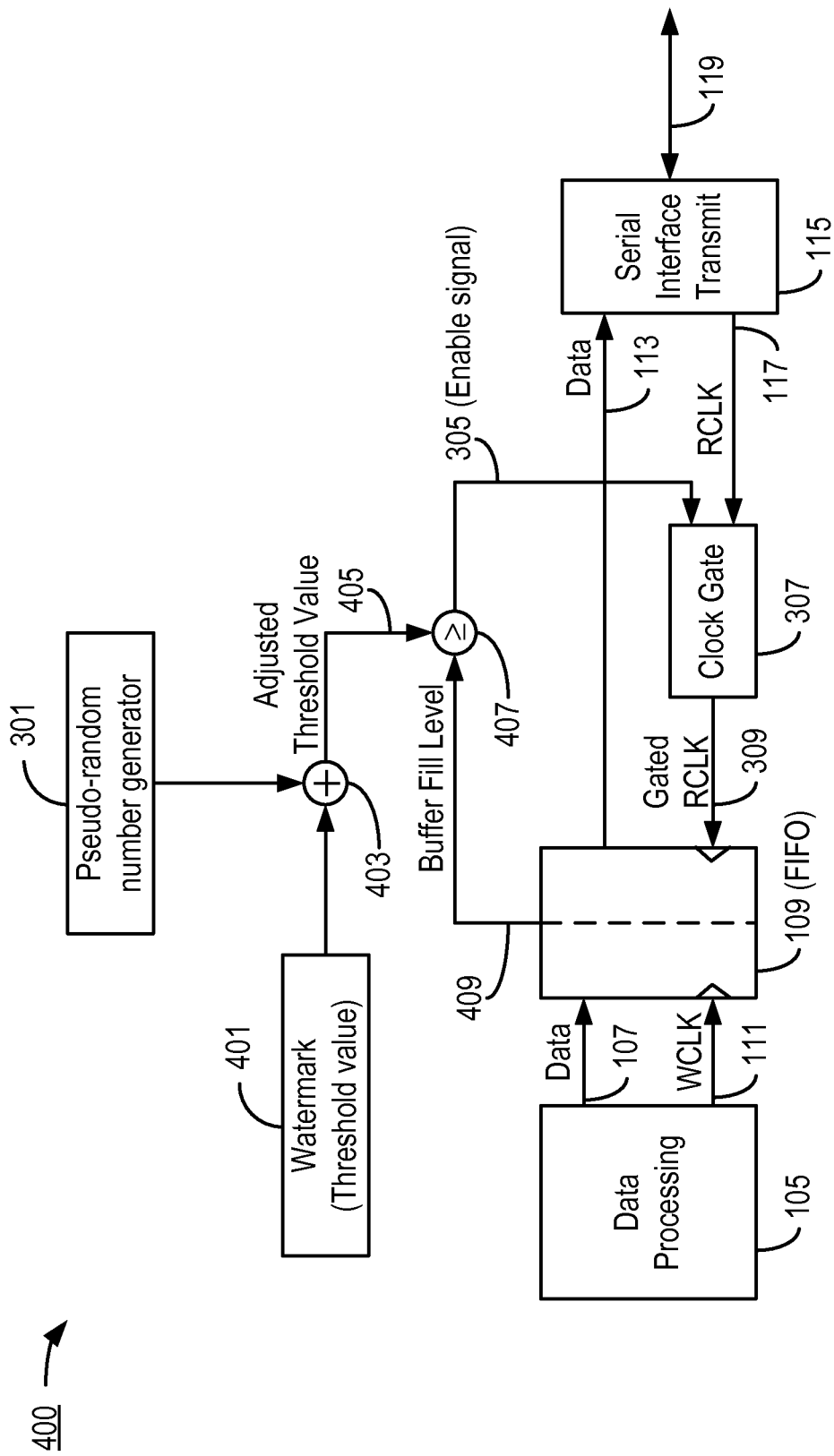
FIG. 4 is a block diagram of exemplary circuitry configured to carry out aspects of the invention, such as those illustrated in FIGS. 2 and 3.

The pseudo-random number influenced enable signal generator 303 can be implemented in any of a number of alternative embodiments. A first alternative embodiment is illustrated in FIG. 4, which is a block diagram of circuitry 400 configured to carry out aspects of the invention, such as those illustrated in FIGS. 2 and 3. Some of the elements that make up the circuitry 400 are also included in the earlier-described circuitry 100 and/or circuitry 300 and they have therefore been identified with the same reference numerals.

As with earlier-described embodiments, a data processing block 105 supplies data 107 to a FIFO buffer 109. The data 107 is written into the FIFO buffer 109 under the control of a write clock (WCLK) signal 111.

Data 113 is read out of the FIFO buffer 109 and supplied to a serial interface transmit block 115, which, in part, controls this read operation by means of a read clock (RCLK) signal 117. A link 119 connects the output of the serial interface transmit block 115 to the input of a serial interface receive block (not shown) associated with the recipient of the data.

In this embodiment, the reading of frames out of the FIFO buffer 109 is triggered based on the buffer fill level reaching a threshold level. The threshold level changes from one frame to the next, and is derived as follows. A set threshold value (watermark) 401 is predefined and can remain unchanged from one frame to the next. The circuitry 400 also includes a pseudo-random number generator 301 that generates a pseudo-random number that is supplied to one input of combining circuitry such as an adder 403. The pseudo-random number generator 301 generates a new pseudo-random number for each successive frame. Another input of the adder 403 receives the predefined threshold value 401 and adds these two values together to produce an adjusted threshold value 405.

The adjusted threshold value 405 is supplied to one input of a comparator 407. The buffer fill level 409 is obtained and supplied to another input of the comparator 407. The output of the comparator indicates whether the buffer fill level 409 satisfies a predetermined comparison criterion (e.g., equal to, greater than, greater than or equal to, etc.) relative to the adjusted threshold value 405. If the predetermined comparison criterion is satisfied, then the output signal of the comparator 403 is asserted. The output signal from the comparator 403 is used as an enable signal 305 that is supplied to one input of a clock gate 307. Another input of the clock gate 307 receives the RCLK signal 117. With this arrangement, the RCLK signal 117 is inhibited from being passed along to the FIFO buffer 109 until the enable signal 305 is asserted. The gated RCLK signal 309, made available at the output of the clock gate 307, is therefore supplied to the clock input of the FIFO buffer 109.

It will be understood that, by having the adjusted threshold value vary from frame to frame based on the number supplied by the pseudo-random number generator, the start time of the next transmission of a frame of data is influenced.

Because of the influence of the pseudo-random number, assertions of the enable signal are not spaced apart at regular intervals, but are instead spaced apart by pseudo-randomly varying intervals. In this way, the frame transmissions are also spaced apart from one another at pseudo-randomly varying intervals, thereby limiting the generation of interference associated with the serial link.

The following additional comments can be made about embodiments that are consistent with the exemplary embodiment of FIG. 4:

In these embodiments, frame transmission is controlled by the data stream itself in that activity is triggered only when sufficient data to constitute a complete frame have been accumulated in the FIFO buffer 109. This is accomplished by having the fill level of the buffer trigger the sending of the data. This type of embodiment is particularly useful in a received processing chain in which the data rate is controlled by an Analog-to-Digital (A/D) converter (not shown).

The pseudo-random number generator can be implemented in any number of known ways. One embodiment involves the use of a maximum length Linear Feedback Shift Register (LFSR), such as the LFSR 500 illustrated in FIG. 5. A shift register 501 is made from a plurality of D-flip-flops connected in series. Outputs from two of the flip-flops are supplied as inputs to an Exclusive OR (XOR) gate 503, the output of which provides linear feedback in the form of a bit that is fed back to the input of the first flip-flop in the series.

In this example, outputs 505, 507, 509 are tapped from the last three flip-flops in the series, respectively, so that a 3-bit pseudo-random number will be generated. However, in order to enhance the pseudo-random properties of the arrangement, the output 505 from the second-from-last flip-flop is used directly, the output 507 of the first-from-last flip-flop is supplied to a 1-clock delay unit 511, and the output 509 from the last flip-flop is supplied to a 2-clock delay unit. This has the effect of having taken outputs from non-consecutive ones of the flip-flops in the shift register 501. The outputs of 1-clock delay unit 511 and the 2-clock delay unit 513, as well as the output 505 of the second-from-last flip-flop are concatenated to form a 3-bit output 515 that represents the pseudo-random number.

When an LFSR is used to generate the pseudo-random number, its size can be selected according to the trade-off between performance requirements and implementation complexity. 7-bit and 9-bit LFSRs ("LFSR 7" and "LFSR 9", respectively) are typically good candidates. Such structures are generally known in the art and need not be described here further.

It will be observed that in the embodiments employing an LFSR, pseudo-random data that are used to apply an offset to the watermark reference value use one or several bits of code out of all of those made available by the shift register. The number of bits used will depend on the timing excursion that the system can tolerate. This can typically be programmable. Each step of offset will be moving frame transmission by one write period of the buffer. The system must be capable of tolerating the maximum excursion. If it cannot, the maximum magnitude of offset excursion should be reduced.

In order to have a different pseudo-random number for each frame, the shift register 501 is updated each time a frame is sent.

In embodiments in which frame transmission is triggered based on the buffer fill level, the average value of the pseudo-random generator does not need to be precisely controlled because the data rate is maintained by means of the push of the data into the FIFO buffer 109.

The offset is preferably applied as a positive offset to the watermark because this is simpler to implement, and is safer from a system perspective. In such embodiments, the watermark is set as a minimum number of data needed to fill a complete frame. However, there is no reason why alternative embodiments cannot be devised in which the pseudo-random number can represent negative values, or both positive and negative values. Those of ordinary skill in the art will readily appreciate how the watermark value would be set in such embodiments to ensure that the maximum negative excursion does not cause the watermark value to fall below the minimum number of data needed to fill a complete frame.

Figure 6A:
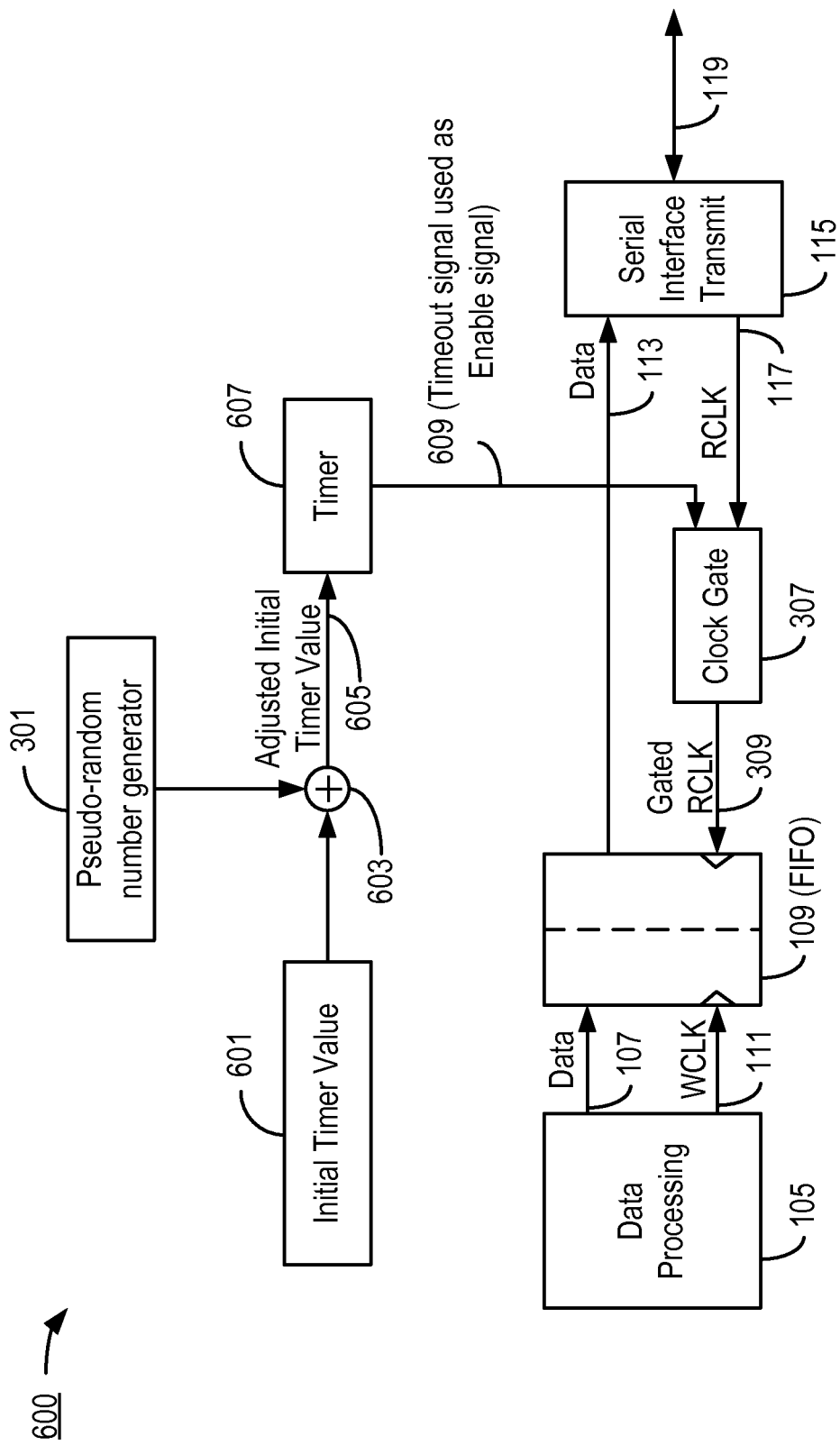
FIG. 6a is a block diagram of circuitry configured to carry out aspects of the invention, such as those illustrated in FIGS. 2 and 3, in accordance with a second alternative embodiment.

As mentioned earlier, the pseudo-random number influenced enable signal generator 303 can be implemented in any of a number of alternative embodiments. A second alternative embodiment is illustrated in FIG. 6a, which is a block diagram of circuitry 600 configured to carry out aspects of the invention, such as those illustrated in FIGS. 2 and 3. Some of the elements that make up the circuitry 600 are also included in the earlier-described circuitry 100 and/or circuitry 300 and they have therefore been identified with the same reference numerals.

As with earlier-described embodiments, a data processing block 105 supplies data 107 to a FIFO buffer 109. The data 107 is written into the FIFO buffer 109 under the control of a write clock (WCLK) signal 111.

Data 113 is read out of the FIFO buffer 109 and supplied to a serial interface transmit block 115, which, in part, controls this read operation by means of a read clock (RCLK) signal 117. A link 119 connects the output of the serial interface transmit block 115 to the input of a serial interface receive block (not shown) associated with the recipient of the data.

In this embodiment, the reading of frames out of the FIFO buffer 109 is triggered based on expiration of a time period. In order to limit interference, the timing between successive frames is modified in a pseudorandom way, such as by adding a random offset to a timer duration value. The timeout interval changes from one frame to the next, and is derived as follows. An initial timer value 601 is predefined and can remain unchanged from one frame to the next. The circuitry 600 also includes a pseudo-random number generator 301 that generates a pseudo-random number that is supplied to one input of combining circuitry such as an adder 603. The pseudo-random number generator 301 generates a new pseudo-random number for each successive frame. Another input of the adder 603 receives the predefined initial timer value 601 and adds these two values together to produce an adjusted initial timer value 605.

The adjusted initial timer value threshold value 605 is supplied to a timer 607 for purposes of setting an initial timer value. The timer 607 can be implemented as, for example, a counter, in which case the initial timer value is an initial count value. In this embodiment, it will be assumed that the timer 607 is implemented as a counter that counts down from an initial value and asserts a timeout signal 609 when the count value reaches zero. In alternative embodiments, the counter could count up, in which case the timeout signal is asserted when a maximum value is reached or when the count "rolls over" to zero.

After initialization, the timer 607 is started and eventually counts down to zero, thereby causing assertion of the timeout signal 609. The timeout signal 609 is used as an enable signal that is supplied to one input of a clock gate 307. Another input of the clock gate 307 receives the RCLK signal 117. With this arrangement, the RCLK signal 117 is inhibited from being passed along to the FIFO buffer 109 until the enable signal 305 is asserted. The gated RCLK signal 309, made available at the output of the clock gate 307, is therefore supplied to the clock input of the FIFO buffer 109.

It will be understood that, by having the adjusted initial timer value vary from frame to frame based on the number supplied by the pseudo-random number generator, the duration of the timeout period, and therefore the start time of the next transmission of a frame of data is influenced.

Figure 6B:
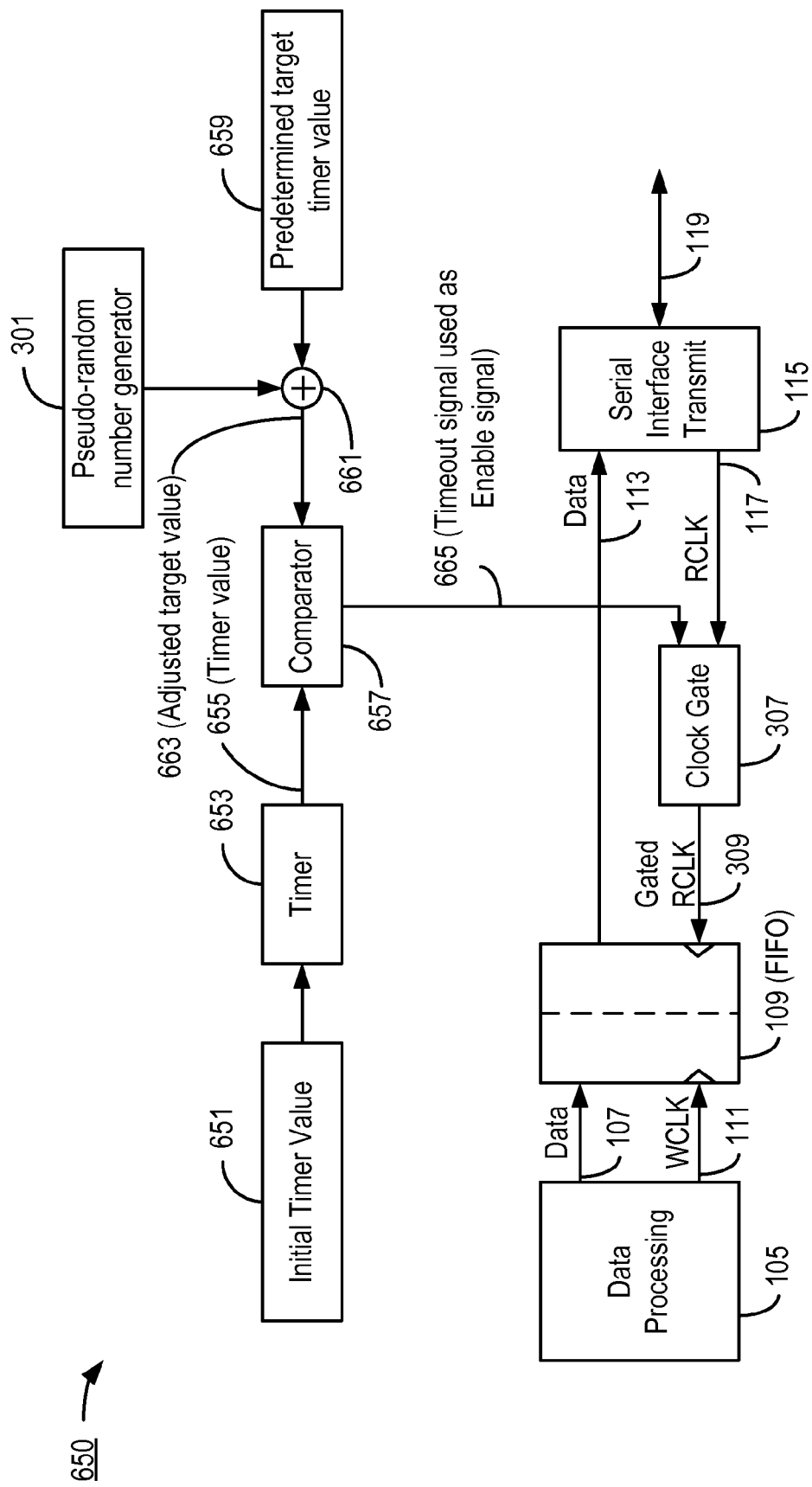
FIG. 6b is a block diagram of circuitry configured to carry out aspects of the invention, such as those illustrated in FIGS. 2 and 3, in accordance with a third alternative embodiment.

A third alternative embodiment is illustrated in FIG. 6b, which is a block diagram of circuitry 650 configured to carry out aspects of the invention, such as those illustrated in FIGS. 2 and 3. Some of the elements that make up the circuitry 650 are also included in the earlier-described circuitry 100 and/or circuitry 300 and they have therefore been identified with the same reference numerals.

As with earlier-described embodiments, a data processing block 105 supplies data 107 to a FIFO buffer 109. The data 107 is written into the FIFO buffer 109 under the control of a write clock (WCLK) signal 111.

Data 113 is read out of the FIFO buffer 109 and supplied to a serial interface transmit block 115, which, in part, controls this read operation by means of a read clock (RCLK) signal 117. A link 119 connects the output of the serial interface transmit block 115 to the input of a serial interface receive block (not shown) associated with the recipient of the data.

Similar to the embodiment described with reference to FIG. 6a, the embodiment depicted in FIG. 6b causes the reading of frames out of the FIFO buffer 109 to be triggered based on expiration of a time period. In order to limit interference, the timing between successive frames is modified in a pseudo-random way. The timeout interval changes from one frame to the next, and is derived as follows. An initial timer value 651 is predefined and can remain unchanged from one frame to the next. The initial timer value 651 is supplied to a timer 653 for purposes of setting an initial timer value. The timer 653 can be implemented as, for example, a counter, in which case the initial timer value is an initial count value. In this embodiment, it will be assumed that the timer 653 is implemented as a counter that counts up from an initial value. However, in alternative embodiments, the counter could count down from the initial value. The timer 653 outputs a present timer value 655 as it is counting, and this is supplied to one input of a comparator 657.

The purpose of the comparator 657 is to detect when the timer value 655 has reached a target value. In this embodiment, the target value is made to vary in a pseudo-random way by means of the following components. The circuitry 650 includes a pseudo-random number generator 301 that generates a pseudo-random number that is supplied to one input of combining circuitry such as an adder 661. The pseudo-random number generator 301 generates a new pseudo-random number for each successive frame. Another input of the adder 661 receives a predetermined target timer value 659 and adds these two values together to produce an adjusted target timer value 663. The adjusted target timer value 663 is supplied as the other input to the comparator 657.

After initialization, the timer 607 is started and eventually begins counting (up or down, depending on implementation). At some point, the comparator will detect that a present timer value has reached the adjusted target timer value, and this causes assertion of the timeout signal 665. The timeout signal 665 is used as an enable signal that is supplied to one input of a clock gate 307. Another input of the clock gate 307 receives the RCLK signal 117. With this arrangement, the RCLK signal 117 is inhibited from being passed along to the FIFO buffer 109 until the enable signal 305 is asserted. The gated RCLK signal 309, made available at the output of the clock gate 307, is therefore supplied to the clock input of the FIFO buffer 109.

It will be understood that, by having the adjusted target timer value vary from frame to frame based on the number supplied by the pseudo-random number generator, the duration of the timeout period, and therefore the start time of the next transmission of a frame of data is influenced.

As with earlier-described embodiments, because of the influence of the pseudo-random number, assertions of the enable signal in the embodiments of FIGS. 6a and 6b are not spaced apart at regular intervals, but are instead spaced apart by pseudo-randomly varying intervals. In this way, the frame transmissions are also spaced apart from one another at pseudo-randomly varying intervals, thereby limiting the generation of interface associated with the serial link.

Figure 5:
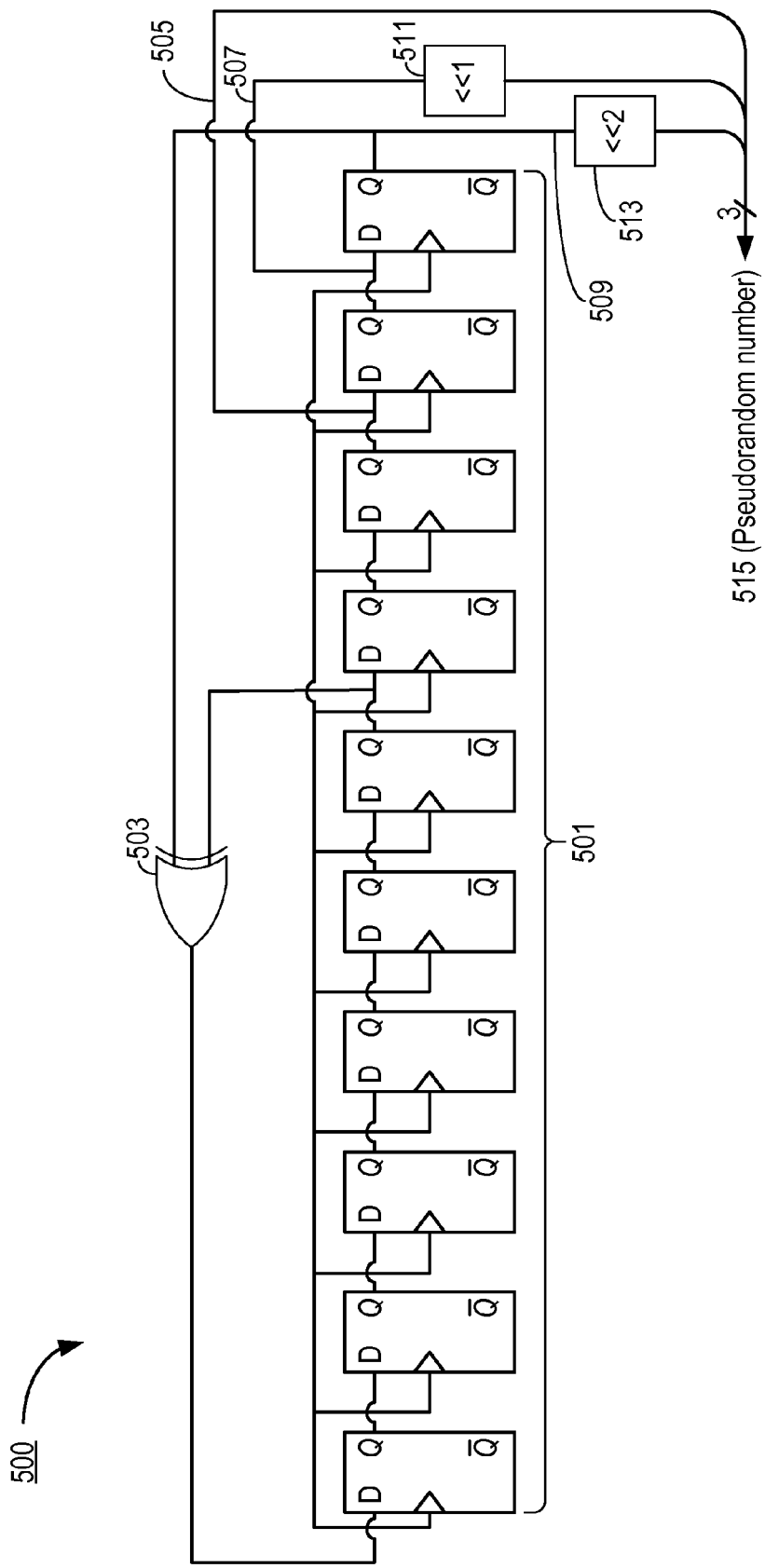
FIG. 5 is an exemplary Linear Feedback Shift Registered configured to generate pseudo-random numbers for use in various embodiments.

The following additional comments can be made about embodiments that are consistent with the exemplary embodiments of FIGS. 6a and 6b:

The pseudo-random number generator 301 can be implemented in any number of known ways including, but not limited to, an LFSR structure such as the exemplary LFSR 500 illustrated in FIG. 5. However, it should be understood that LFSR structures are typically not fully centered (i.e., the average generated value may not be exactly half-way between the minimum and maximum values). Accordingly, if the timer-based system is sensitive to an error on the average value of the random data (which might possibly cause frames to be issued too slowly or too quickly), provisions should be made for monitoring and compensating the values to bring the average value as close to center as possible. A simple way of doing this comprises keeping an additional free running counter emulating the sending of frames at nominal intervals, and monitoring a comparison between how many theoretical frames should have been sent and the number of frames that were actually sent. If the difference between the two values exceeds a threshold value, then compensation can be invoked (i.e., sending either more or fewer frames, depending on the outcome of the comparison, in order to bring the actual and theoretical values closer together).

Alternatively, in such cases, the pseudo-random generator should be designed in a manner that guarantees a centered average value. By way of example, and without limitation, a suitable pseudo-random generator design for such embodiments is described by Fabien Journet in WO 2013/045535, entitled "M-ary Sequence Clock Spreading", published on Apr. 4, 2013.

The pseudo-random offset in embodiments such as those illustrated in FIGS. 6a and 6b should be applied as a signed offset in order to maintain correct frequency of the frame transmission.

The offset dynamic is dimensioned by the phase error (timing jitter) that is applied to the system. The amount of offset (e.g., the number of bits of the pseudo-randomly generated number) used will depend on the timing excursion/jitter that the system can tolerate.

A number of graphs will now be presented to illustrate the performance and utility of the various described embodiments.

Figure 7:
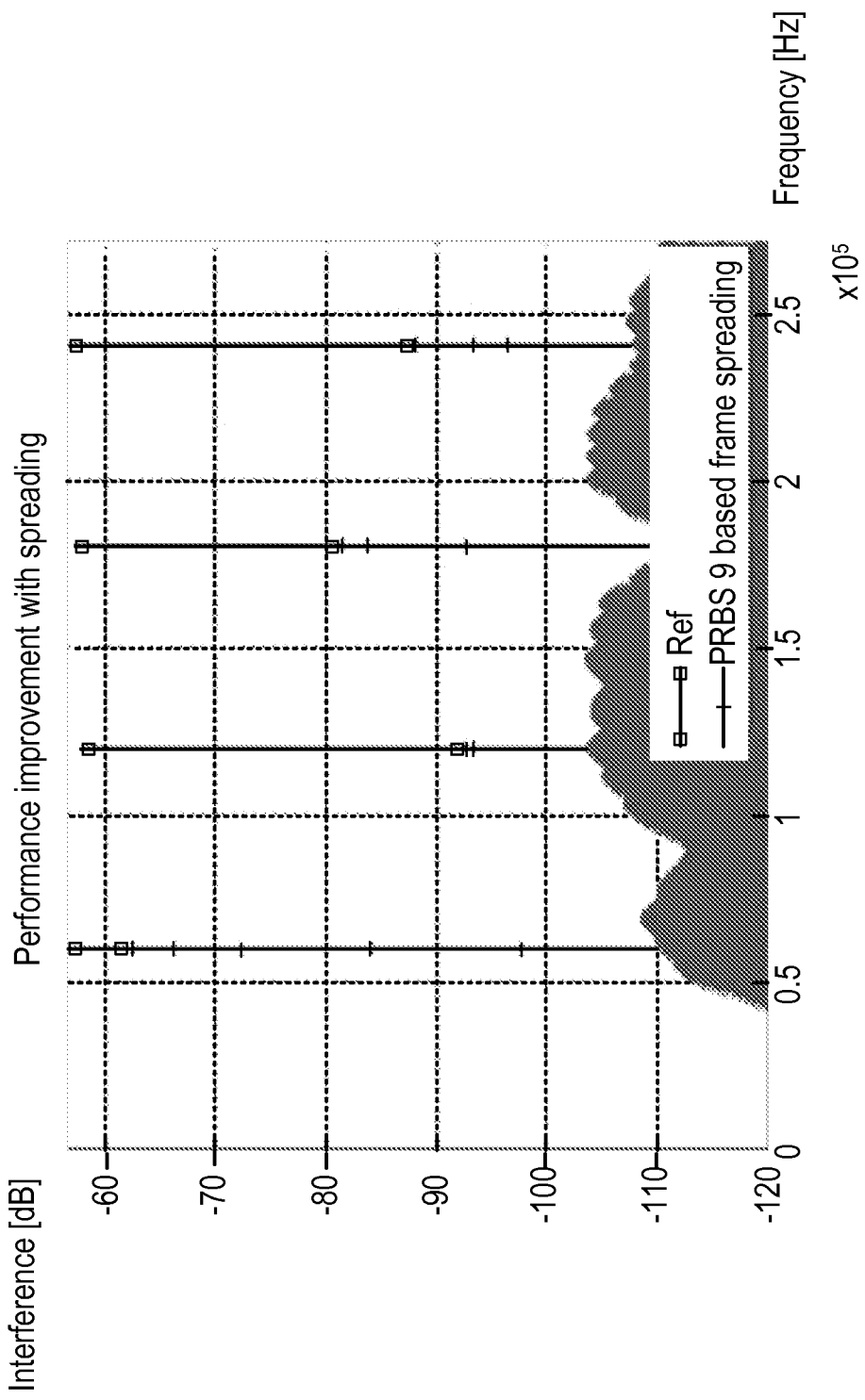
FIG. 7 is a graph showing performance improvement with embodiments employing 3-bits of Pseudo-Random Binary Sequence 9 spreading.

FIG. 7 is a graph showing performance improvement with spreading. Both reference results as well as results achieved using 3-bits of Pseudo-Random Binary Sequence (PRBS) 9 spreading are shown. The interference power level is plotted on the Y-axis, and frequency is plotted on the X-axis. The lines labeled "Ref" illustrate the power levels obtained at respective frequencies in an exemplary serial link circuit when no techniques are applied to limit interference. In this simulated example, a typical frame rate could be in the range of 60 KHz, with harmonics over 120 KHz, 180 KHz, and 240 KHz. The lines labeled "PRBS 9 based frame spreading" show the power levels obtained at respective frequencies in the same exemplary serial link circuit when above-described techniques, involving PRBS 9 spreading are employed. The difference between the two lines at any given frequency shows the amount of interference reduction. It can be seen that the power removed from the peaks by the exemplary embodiment in accordance with aspects of the invention are distributed nonuniformly over the complete spectrum with very low power, and are therefore very unlikely to disturb the system.

Figure 8:
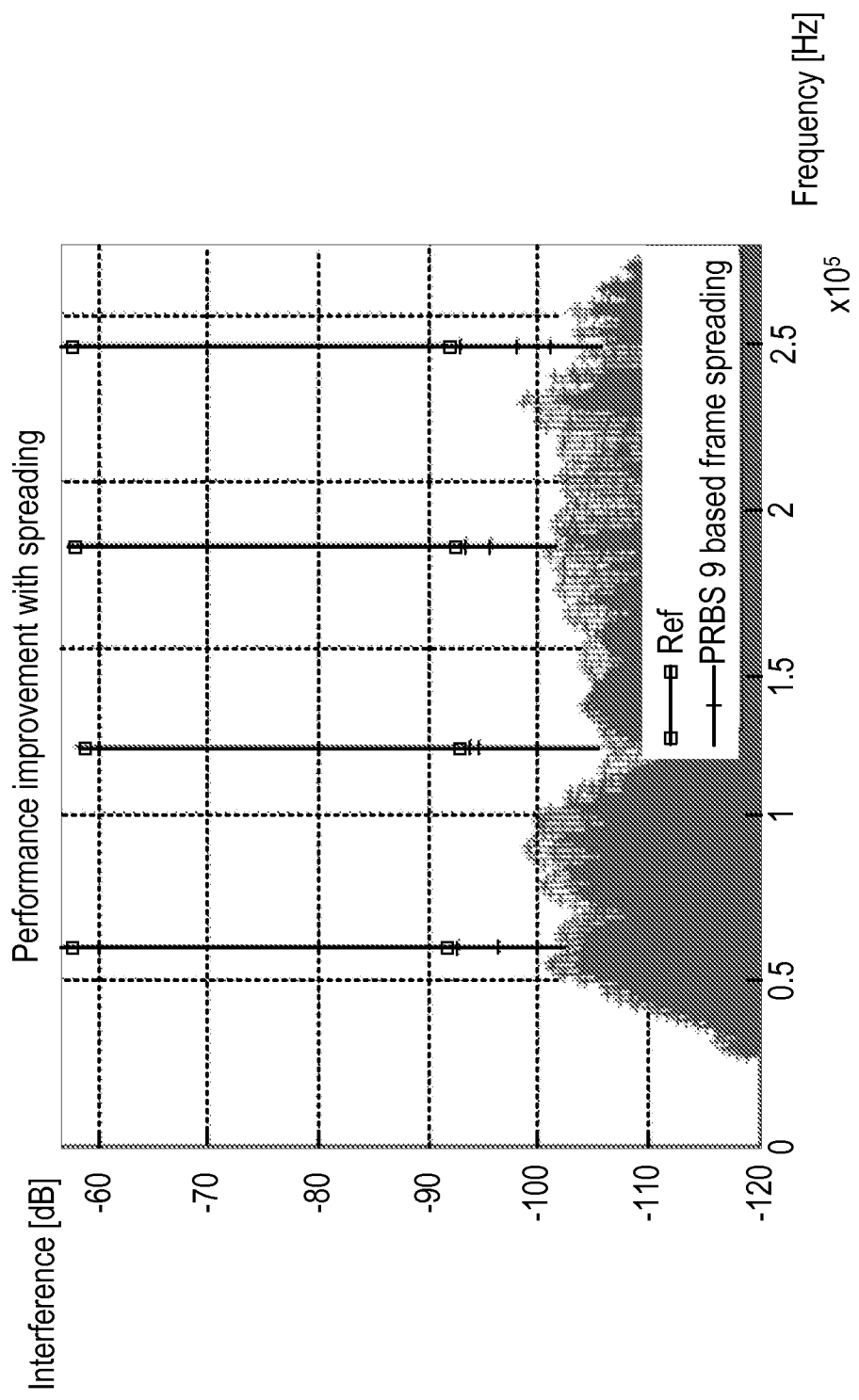
FIG. 8 is a graph showing performance improvement with embodiments employing 2-bits of Pseudo-Random Binary Sequence 9 spreading.

FIG. 8 is a similar graph showing performance improvement with spreading. Both reference results as well as results achieved using 2-bits of PRBS 9 spreading are shown. The interference level is plotted on the Y-axis, and frequency is plotted on the X-axis. The improvement (i.e., interference reduction) is seen here as well.

Figure 9B:
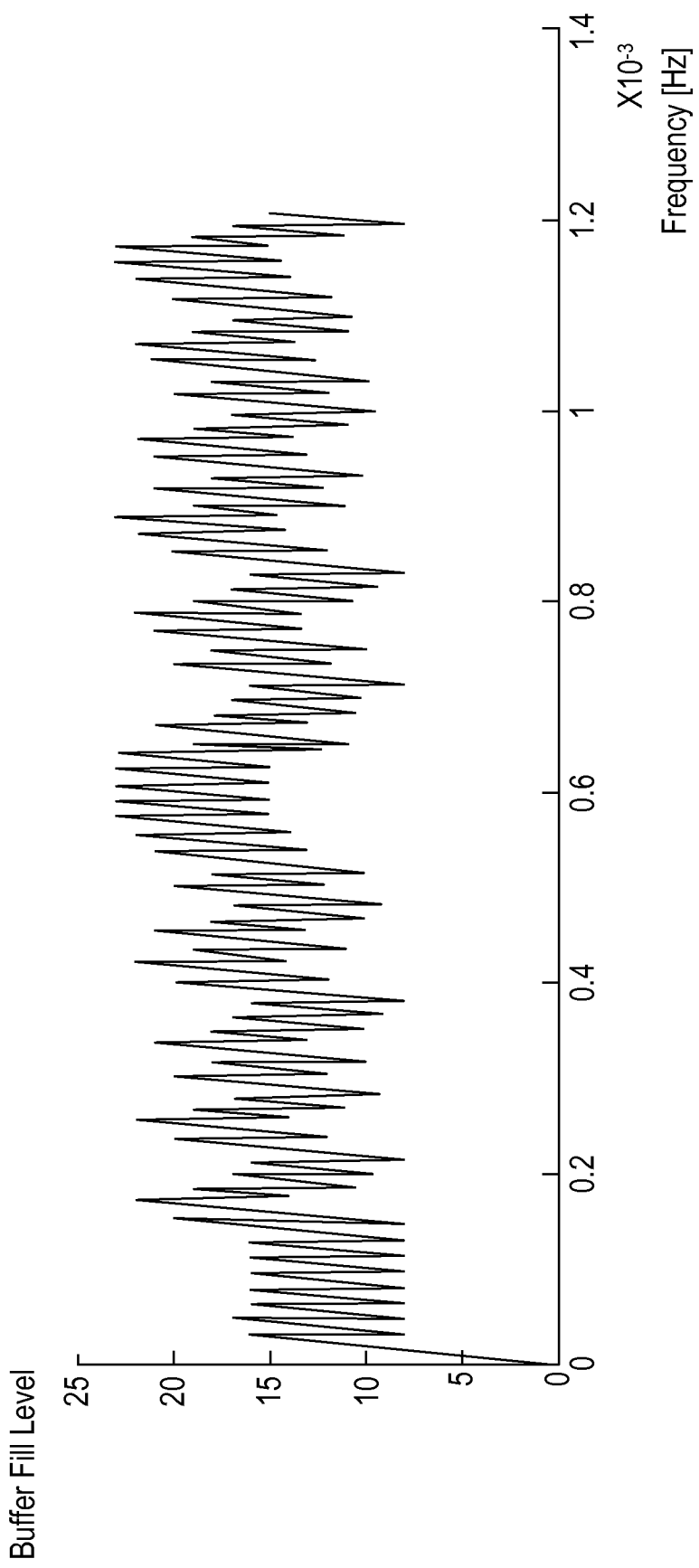

FIGS. 9a and 9b are graphs that enable comparison between the buffer fill level without (FIG. 9a) and with (FIG. 9b) spreading in accordance with embodiments consistent with the invention. In each of these figures, time is plotted on the horizontal axis, and buffer fill level is plotted on the horizontal axis. It can be seen that without spreading (FIG. 9a), the buffer fill level cycles consistently between the same minimum and maximum levels with regularity, thereby creating significant interfering signals.

By comparison, the application of spreading (FIG. 9b) causes the fill levels to vary inconsistently and with irregular frequency, thereby limiting the resultant interfering signals.

Embodiments employing aspects of the invention provide a number of advantages over conventional circuitry such as, but not limited to:

Such embodiments significantly decrease the level of interference generated by serial link periodic activity. Analysis shows that a 36 dB gain can be achieved for a typical implementation based on PRBS 9 with 3-bit spreading.

The impact on interference is both on externally generated interference and on interference that is internally generated by the on/off switching of the physical part of the serial interface.

Such embodiments permit adjustment of performance trade-off by reconfiguring the number of bits used for spreading. In a system that supports several modes with different system constraints, the trade-off can be easily and dynamically adjusted.

Such embodiments limit implementation cost because they are associated with low overhead. A global implementation requires fewer than 20 flip-flops including a pipeline stage, one adder and one comparator.

Several building blocks within an IC connected to the serial link (used as a communication channel between blocks)

can use the above-described technology very efficiently by having different seeds for pseudo-random generation.

The invention has been described with reference to particular embodiments. However, it will be readily apparent to those skilled in the art that it is possible to embody the invention in specific forms other than those of the embodiment described above. Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of transmitting a plurality of frames of data over a serial interface, the method comprising:
   for each frame of the plurality of frames of data:
   generating a pseudo-random number;
   asserting a read control signal at a moment in time, wherein a timing of the moment in time is influenced by the pseudo-random number;
   adjusting a threshold value as a function of the pseudo-random number;
   comparing a data buffer fill level with the adjusted threshold value and asserting an enabling signal in response to satisfaction of a comparison criterion;
   enabling assertion of the read control signal in response to assertion of the enabling signal;
   in response to the asserted read control signal, reading a frame of data from a data buffer; and
   transmitting the read frame of data over the serial interface.

2. The method of claim 1, wherein generating the pseudo-random number comprises receiving an output value of a pseudo-random number generator.

3. The method of claim 2, wherein the pseudo-random number generator is a Linear Feedback Shift Register comprising a number of shift registers N, and wherein the output value of the pseudo-random number generator is derived from outputs of M of the shift registers, wherein $1<M<N$.

4. An apparatus for transmitting a plurality of frames of data over a serial interface, the apparatus comprising:
   a pseudo-random number generator that generates a pseudo-random number for each frame of the plurality of frames of data;
   a read control signal generator that asserts a read control signal at a moment in time, wherein a timing of the moment in time is influenced by the pseudo-random number;
   a threshold value adjuster configured to adjust a threshold value as a function of the pseudo-random number;
   a comparator configured to compare a data buffer fill level with the adjusted threshold value and to assert an enabling signal in response to satisfaction of a comparison criterion; and
   a signal enabler configured to enable assertion of the read control signal in response to assertion of the enabling signal;
   a data buffer that receives the asserted read control signal and, in response to the asserted read control signal, outputs a frame of data from a data buffer; and
   a serial interface coupled to the data buffer to receive the read frame of data from the data buffer and to transmit the frame of data over a link.

5. The apparatus of claim 4, wherein the pseudo-random number generator is a Linear Feedback Shift Register comprising a number of shift registers N, and wherein the output value is derived from outputs of M of the shift registers, wherein $1<M<N$.

* * * * *